(12) United States Patent
Cheong et al.

(10) Patent No.: US 9,081,495 B2
(45) Date of Patent: Jul. 14, 2015

(54) APPARATUS AND METHOD FOR PROCESSING DATA IN TERMINAL HAVING TOUCH SCREEN

(75) Inventors: Cheol Ho Cheong, Seoul (KR); Jae Sun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 12/942,388

(22) Filed: Nov. 9, 2010

(65) Prior Publication Data

US 2011/0113366 A1 May 12, 2011

(30) Foreign Application Priority Data

Nov. 10, 2009 (KR) .................... 10-2009-0107908

(51) Int. Cl.
G06F 3/048 (2013.01)
G06F 3/0488 (2013.01)
G06K 9/00 (2006.01)

(52) U.S. Cl.
CPC ........ G06F 3/04883 (2013.01); G06K 9/00416 (2013.01)

(58) Field of Classification Search
CPC ....................................................... G06F 3/048
USPC ........................................................ 715/806
See application file for complete search history.

(56) References Cited

U.S. PATENT DOCUMENTS

| | | | |
|---|---|---|---|
| 7,251,365 B2 * | 7/2007 | Fux et al. ............... | 382/185 |
| 7,283,129 B1 * | 10/2007 | Sawada et al. .......... | 345/204 |
| 7,606,421 B2 * | 10/2009 | Poor ........................ | 382/186 |
| 7,653,218 B1 * | 1/2010 | Malitz et al. ............ | 382/113 |
| 2007/0014488 A1 * | 1/2007 | Chen et al. .............. | 382/294 |
| 2007/0123300 A1 | 5/2007 | Park et al. | |
| 2007/0262993 A1 * | 11/2007 | Fux et al. ................ | 345/472 |
| 2007/0274591 A1 | 11/2007 | Chang | |
| 2009/0002392 A1 * | 1/2009 | Hou et al. ............... | 345/619 |
| 2009/0103769 A1 * | 4/2009 | Milov et al. ............ | 382/100 |

(Continued)

FOREIGN PATENT DOCUMENTS

| | | |
|---|---|---|
| KR | 93-008770 B1 | 9/1993 |
| KR | 10-0236247 B1 | 12/1999 |
| KR | 10-2007-0019333 A | 2/2007 |
| KR | 10-0737998 B1 | 7/2007 |

(Continued)

OTHER PUBLICATIONS

El Abed, H. Comparison of Different Preprocessing and Feature Extraction Methods for Offline Recognition of Handwritten ArabicWords, IEEE, Document Analysis and Recognition, 2007. ICDAR 2007. Ninth International Conference on (vol. 2 ) Date of Conference: Sep. 23-26, 2007 pp. 974-978.*

*Primary Examiner* — Jennifer To
*Assistant Examiner* — Xuyang Xia
(74) *Attorney, Agent, or Firm* — Jefferson IP Law, LLP

(57) ABSTRACT

An apparatus and a method for processing data of a terminal are provided. The method includes displaying a feature point extracting method selection window for selecting a feature point extracting method for extracting feature point information which specify data according to displayed data, in a Data save mode which saves at least one data displayed on one screen, extracting the feature point information according to the data by using the feature point extracting method selected through the feature point extracting method selection window, and saving at least one feature point information extracted according to the data as group feature point information.

6 Claims, 10 Drawing Sheets

(56) References Cited

U.S. PATENT DOCUMENTS

2010/0074527 A1* 3/2010 Vukosavljevic et al. ...... 382/187
2011/0057884 A1* 3/2011 Gormish et al. ............. 345/173

FOREIGN PATENT DOCUMENTS

| KR | 10-2008-0019875 A | 3/2008 |
| WO | 2004/057892 A1 | 7/2004 |

* cited by examiner

APPARATUS AND METHOD FOR PROCESSING DATA IN TERMINAL HAVING TOUCH SCREEN

PRIORITY

This application claims the benefit under 35 U.S.C. §119(a) of a Korean patent application filed on Nov. 10, 2009 in the Korean Intellectual Property Office and assigned Serial No. 10-2009-0107908, the entire disclosure of which is hereby incorporated by reference.

BACKGROUND OF THE INVENTION

1. Field of the Invention

The present invention relates to a method for processing data in a terminal having a touch screen and an apparatus for implementing the same. More particularly, the present invention relates to a method and apparatus for processing input data in a terminal having a device capable of displaying the input data.

2. Description of the Related Art

Recently, a terminal, such as a portable terminal, a Personal Digital Assistant (PDA), an electronic notebook, a Portable Multimedia Player (PMP), have become widely used. Devices such as a keypad, a keyboard, or a touch pad or a touch screen are included as part of the terminal and equipped to input certain data to the terminal. Among the devices, the touch screen has the ability to input an image or to input a shape. Since an input unit and a display unit can be implemented as one apparatus, the touch screen has been mounted to a plurality of terminals. The data input through the touch screen are usually saved with an image file type. Alternatively, the input data is converted into character information through an on-line character recognition technique and saved, or used for a specific function such as a message input. A method for saving data input through the touch screen can be divided into two method types.

The first method type is a method for converting data such as a stroke, a line, and a spot input by user into pixel unit information and saving the pixel unit information. The first method can maintain an original form of the input data as the data is saved nearly without any loss. However, the first method is disadvantageous in that it requires a large amount of saving space because unnecessary information such as a background screen to which data is input is also saved. Moreover, since noise information due to an unnecessary stroke made or a hand shake is also saved, it may be obscure or difficult to clearly display data.

The second method type is a method for saving data by using an on-line character recognition technique. This method converts data input by the user to stroke information, classifies the stroke information into the most similar character element or a character candidate group through a technique such as a feature point analysis, Dynamic Matching, relation analysis of relative location between character elements, input location discrimination, a neural network technique, a fuzzy inference, a genetic algorithm, or a Markov inference model method. The method converts data input through the classified character candidate group or the most similar character element into a character or sign information having an increased probability to be saved with a character string type that a terminal can recognize.

However, the on-line character recognition technique has a problem in that the data such as a sign, a figure, and an image can be saved with its original form as the input data can be converted only into a character and a sign which can be recognized. More particularly, in a case of a drawing or a figure drawn, it cannot be restored into the original form itself, but is converted into a character which is determined to be most similar to the drawing or the figure drawn. As a result, a problem exists in that the character which is determined to be most similar to the drawing or the figure drawn is different from actual data.

Therefore, a need exists for an apparatus and a method for processing data in a terminal having a touch screen.

SUMMARY OF THE INVENTION

An aspect of the present invention is to address at least the above-mentioned problems and/or disadvantages and to provide at least the advantages described below. Accordingly, an aspect of the present invention is to provide a method for processing data in a terminal having a touch screen and an apparatus for implementing the same.

In accordance with an aspect of the present invention, a method for processing data of a terminal is provided. The method includes displaying a feature point extracting method selection window for selecting a feature point extracting method for extracting feature point information which specify data according to displayed data, in a Data save mode which saves at least one data displayed on one screen, extracting the feature point information according to the data by using the feature point extracting method selected through the feature point extracting method selection window, and saving at least one feature point information extracted according to the data as group feature point information.

In accordance with another aspect of the present invention, an apparatus for processing data is provided. The apparatus includes a display unit for displaying at least one data selected, and for displaying a feature point extracting method selection window for selecting a feature point extracting method for extracting feature point information according to the data, a controller for extracting at least one feature point information according to the data by using the feature point extracting method selected through the feature point extracting method selection window, in a Data save mode for saving the data selected, and a storage unit for saving at least one feature point information extracted according to the data as group feature point information under control of the controller.

In accordance with still another aspect of the present invention, a method for processing data is provided. The method includes extracting feature point information according to data by using a feature point extracting method selected, in a Data save mode, saving the feature point information extracted according to the data as group feature point information, determining a feature point restoring method for restoring the group feature point information for displaying data and the feature point information into the data, and restoring data group information included in the group feature point information through the determined feature point restoring method into the data, in a data display mode displaying data corresponding to the saved feature point information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
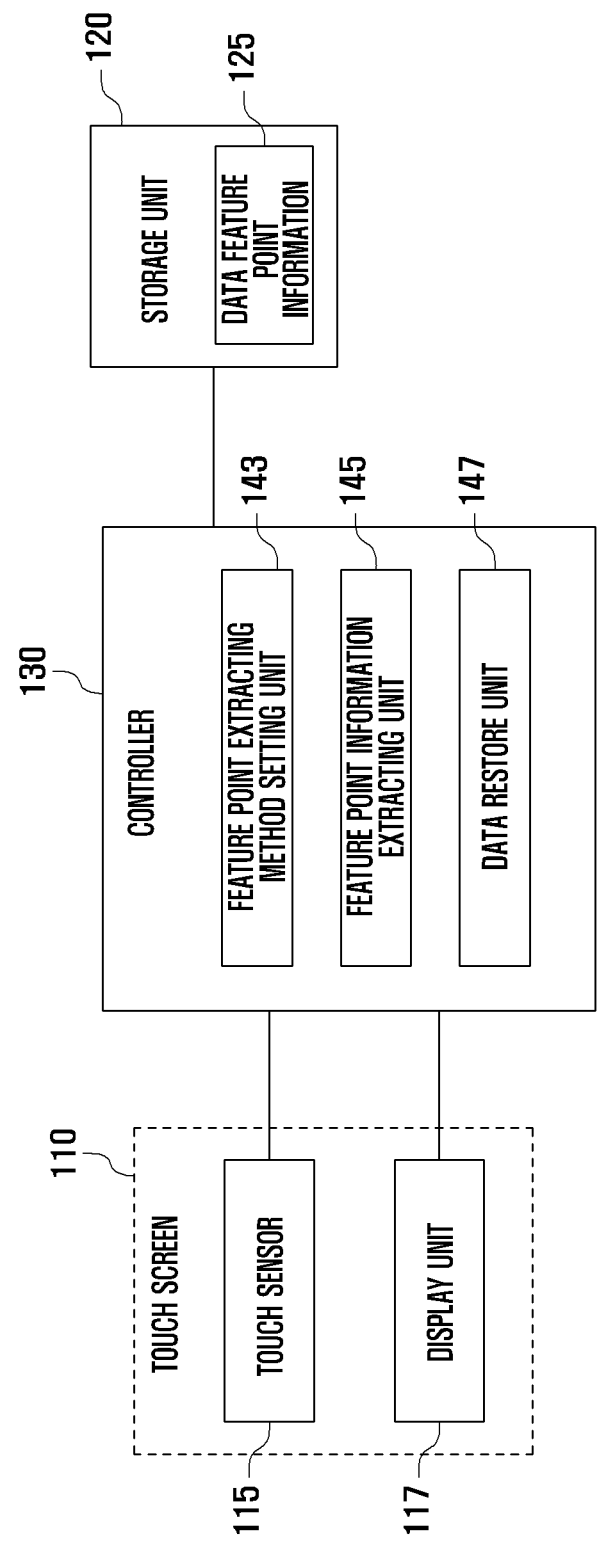
FIG. 1 is a block diagram illustrating a terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a terminal that has a touch screen. The term 'terminal' denotes an information processing unit for processing data downloaded from an external terminal or processing input data. Here, the terminal may be a digital picture frame, a television, E-book, a portable terminal, a notebook computer, and a desktop computer. The term 'data' denotes all data such as an image, a drawing, and a character which may be processed. The term 'feature point information' denotes information which may specify data among information forming data such as stroke information, pixel information, and information of location displaying data, and may be used when data is displayed again on the terminal.

The term 'stroke information' refers to information detected through the touch screen until the input of data is finished after the input is initiated, and includes information regarding an initial point, an endpoint, and successive points. The successive points are input to the interval between the initial point and the endpoint. Moreover, the stroke information is usually indicated by pixel information consisting of a color value and a coordinate. However, the stroke information also includes information regarding a distance between points forming a stroke, an angle, and thickness of a line. The stroke information may also include relative direction vector information. For example, the feature point information using the stroke information may be information of important points which may be specified among information forming stroke information. For example, the feature point refers to a point which may indicate the feature of corresponding stroke information such as the initial point, the endpoint, and a point located in a place where an angle changes over a given angle.

FIG. 1 is a block diagram illustrating a terminal according to an exemplary embodiment of the present invention.

Referring to FIG. 1, the terminal includes a touch screen 110, a storage unit 120, and a controller 130.

The touch screen 110 includes a touch sensor 115 and a display unit 117, and displays data input from a user. In more detail, the touch sensor 115 is included as part of the display unit 117, and may detect a touch event caused by an operation of an input instrument such as a finger of the user or a stylus having contact with a surface of the touch screen 110 and released from the surface. The touch sensor 115 determines a coordinate corresponding to the area in which the contact is detected and a coordinate corresponding to the area in which the release is detected, and may transmit the determined coordinates to the controller 130. By using the transmitted coordinates of the area in which the release is detected and the area in which the contact is detected, the controller 130 recognizes the coordinates as data input from the user, and may display the data in the display unit 117. The display unit 117 displays various information related to a state and an operation of the terminal under the control of the controller 130. The display unit 117 may also display data input through the touch screen 110 and a selection window for selecting a method for saving the input data. Here, the selection window may display the feature point extracting methods for converting the input data into feature point information. The feature point extracting method will be described in more detail further below with reference to FIGS. 2 and 3.

The storage unit 120 may save applications and various information relating to a function executed in the terminal. More particularly, the storage unit 120 saves feature point information 125 extracted for each data through the feature point extracting method under control of the controller 130. The feature point information 125 denotes various information forming data input through the touch screen 110.

For example, the feature point information 125 may be stroke information relating to a line component forming data, a pixel information relating to a color component forming data, and location information relating to a location in which data is displayed in the display unit 117. The storage unit 120 may also save a plurality of data feature point information which is displayed on one screen under the control of the controller 130 as a group. Hereinafter, the feature point information saved as a group is also referred to as group feature point information.

The controller 130 controls a state and overall operations of respective elements constituting the terminal. Here, the controller 130 displays data selected or input by the user through the touch screen 110 to the display unit 117. The data displayed on the display unit 117 includes data selected or input through a message input function, a memo function, a diary function, an image editing function for editing an image such as a photograph or a drawing, and an image display function.

The controller 130 extracts feature point information from data displayed on the display unit 117 through the feature point extracting method which is selected by the user, in a Data save mode. The controller 130 saves the extracted feature point information by controlling the storage unit 120. At this time, the controller 130 combines at least two data feature points by data information displayed on one screen as group feature point information and saves the group feature point information in the storage unit 120. At this time, the Data save mode refers to a mode where data is input or selected to be displayed on the display unit 117, all modes performing the message input function, a memo function, a diary function, and an image editing function.

Moreover, in a data display mode, the controller 130 restores at least one group feature point information saved in the storage unit 120 which is selected by the user and may display the group feature information on the display unit 117. That is, the controller 130 restores feature point information by data included in the group feature point information and may display each data on one screen. Here, the data display mode denotes all modes performing the function of displaying a saved image, and the function of displaying a saved character. The feature point extracting method will be described in more detail below with reference to FIGS. 2 and 3.

The controller 130 includes a feature point extracting method setting unit 143, a feature point information extracting unit 145, and a data restore unit 147 to extract and save feature point information from data and to restore into data by using the saved feature point information. The feature point extracting method setting unit 143 determines the feature point extracting method selected by the user for each data displayed on the display unit 117 in the Data save mode. The feature point extracting method setting unit 143 also determines at least one area for each data displayed on the display unit 117.

The feature point information extracting unit 145 extracts the data feature point information displayed on the display unit 117 by using the feature point extracting method determined according to the feature point extracting method setting unit 143.

The data restore unit 147 restores the data feature point information saved in the storage unit 120 into data in the data display mode. At this time, the data restore unit 147 determines a specific feature point extracting method by which the feature point information saved in the storage unit 120 is extracted, restores the feature point information into data through a feature point restoring method corresponding to the determined feature point extracting method. More specifically, the data restore unit 147 may determine a specific method by which the saved feature point information is extracted to restore data by using the feature point information, and then, set a restoring method. As a result, when the feature point information is saved, feature point type information, e.g., information of stroke and boundary line, may also be saved.

Hence, the data restore unit 147 may set a restoring method when restoring data with reference to the feature point type information. For instance, in a case of just having feature point information, the data restore unit 147 analyzes the structure of the saved feature point information, so that it may easily analogize the restoring method. For example, in a boundary line tracing method, a run-based method may observe a counterpart of pixels having the same y-coordinate and a Miyatake method has connection relation information between boundary line pixels called RD code. Usually, a pixel based or a corner point based boundary extraction technique has division information of an outer-contour and an inner-contour. Therefore, if corresponding methods are selected in a point of time of application, the data restore unit 147 may know a difference between the methods from the saved feature point information. The data restored by such method may be displayed as with various methods through a screen display, printing and the like.

In the Data save mode, the controller 130 saves data feature point information which the feature point information extracting unit 145 extracts through the feature point extracting method determined by the feature point extracting method setting unit 143, by controlling the storage unit 120. In the data display mode, the controller 130 restores the data feature point information saved in the storage unit 120 through the data restore unit 147 and may display the data feature point information on the display unit 117. As the feature point information is saved according to the data, even when a plurality of data is displayed on one screen, editing is possible according to each of the plurality of data.

Although not illustrated, the terminal may further include a communications unit to transmit the saved feature point information to an external terminal, or save feature point data received from the external terminal. The terminal may include various elements such as a digital broadcasting reception unit receiving digital broadcasting data, and a RF unit performing a telecommunication function such as voice communication and image communication.

In a terminal having such elements, in the Data save mode, the controller 130 may display one or more data input or selected by the user on the display unit 117. According to the feature point extracting method selected by the user according to data, the controller 130 may extract data feature point information. The controller 130 saves the feature point information extracted according to data in the storage unit 120. Moreover, in the data display mode, the controller 130 may display one or more data which are chosen by the user on the display unit 117. At this time, the controller 130 determines data feature point information which is chosen by the user, and restores the determined feature point information into data. The restored data may be edited through respective feature point information, and data may be acknowledged as a character according to the feature point extracting method and as one image. A method for extracting data feature point information may be divided into a method for extracting feature point information of stroke information and a method for extracting feature point information of a boundary line. The process of extracting the feature point information through each method is described below with reference to FIGS. 2 and 3.

Figure 2:
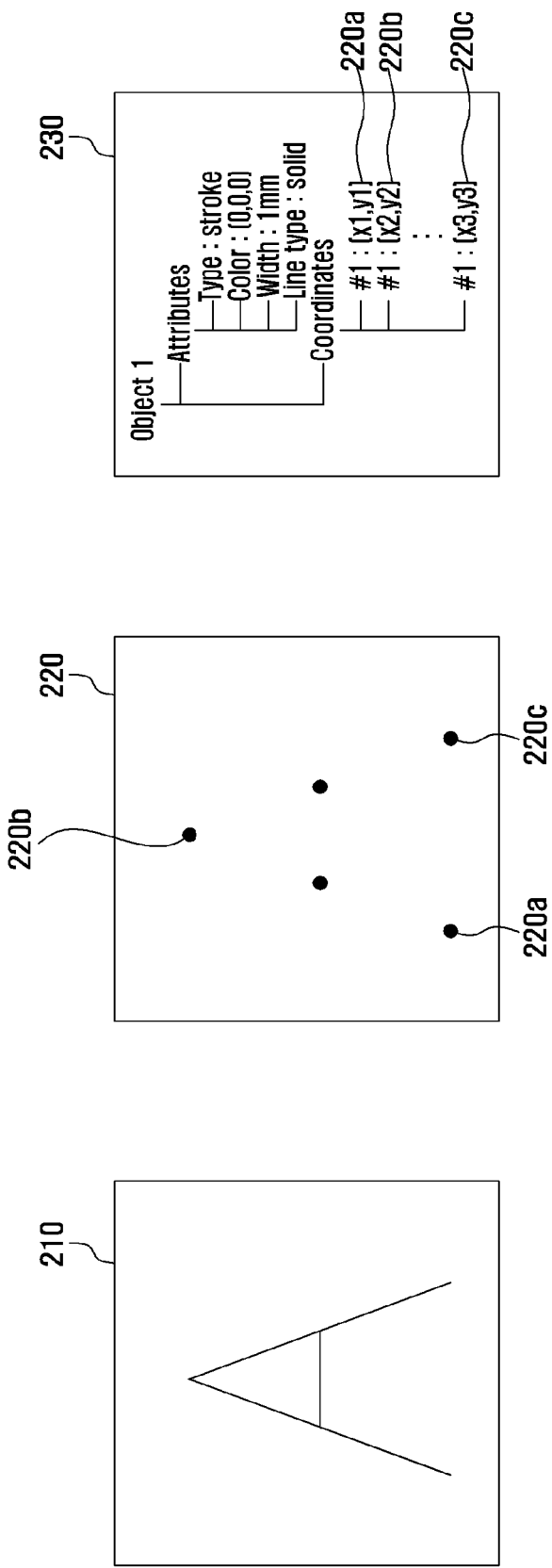
FIG. 2 is a diagram illustrating a method for extracting a feature point for extracting stroke information according to an exemplary embodiment of the present invention.

FIG. 2 is a diagram illustrating a method for extracting a feature point for extracting stroke information according to an exemplary embodiment of the present invention.

First, the method for extracting the feature point information in the stroke information is described. The data displayed on the display unit 117 is composed of a plurality of points. Each point composing data may be stroke information, and includes a color value and a pixel value. The feature point information which may specify data may be extracted from among the stroke information. The feature point information denotes stroke information including the information of an initial point of data input, an endpoint, and a point located in a place where an angle changes over a given angle, among the stroke information. Various techniques are used to extract such feature point information. Representatively, the techniques such as smoothing, hook elimination, distance filtering, and angle filtering are used.

The smoothing technique changes a line segment which is meanderingly input by vibration of a hand into one straight line or curve among phenomenon that occurs when touch input speed is late. The hook elimination technique eliminates information of stroking which is generated by sliding of the hand, a habit, or an error of an input unit, when the line segment is initiated. Moreover, the distance filtering technique removes the in-between points or leaves some points according to the length of the points which are continued in the same direction. The angle filtering technique selects the information of points changing over a given angle as a feature point.

When the feature point information is extracted, the different techniques are used together. For example, if the distance filtering and the angle filtering are used together, the feature point according to distance and angle is extracted. When data is made of a linear component through such techniques, two feature points (i.e., an initial point and an end point of a straight line) forming the linear component is extracted, while more feature points may be extracted according to an angle in a case of a curved portion. More particularly, the feature point information extracting unit 145 of an exemplary embodiment of the present invention removes noise from stroke information through the techniques, and may extract a feature point.

The stroke-based feature point information may be saved according to an input sequence, and respective feature point information may be saved as pixel information which has information of a coordinate, a color, and thickness. Alternatively, the feature point information may be saved as vector information which has the information of a direction, a length, a color, thickness, and the kind of line segment from one point to the next point. Moreover, the stroke-based feature point extracting technique is an appropriate technique for recognizing an image such as an on-line character, a sign, a gesture, a sketch and the like. FIG. 2 illustrates a result of the stroke-based feature point extracting technique.

Referring to FIG. 2, reference numeral 210 illustrates a character 'A' input by a user. Reference numeral 220 illustrates feature point information extracted from among stroke information forming the input character 'A'. For example, a feature point may include reference numeral 220a which is an initial point of data input, reference numeral 220b which is a point in which a direction of a line is changed, and reference numeral 220c which is an endpoint of data input. Reference numeral 230 indicates a form by which the feature point information which is the stroke information extracted from the character 'A' is saved in the storage unit 120. Here, as illustrated by reference numeral 230, the information of locations 220a, 220b, and 220c, which are respective feature points, is saved in the storage unit 120. The boundary line based feature point extracting method is illustrated with reference to FIG. 3.

Figure 3:
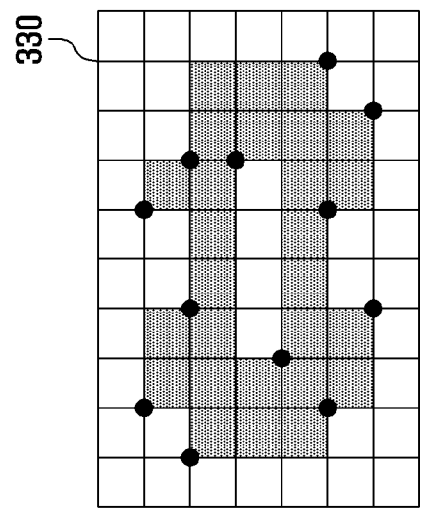
FIG. 3 is a diagram illustrating a method for extracting a feature point for extracting a boundary line based feature point according to an exemplary embodiment of the present invention.
Figure 3:
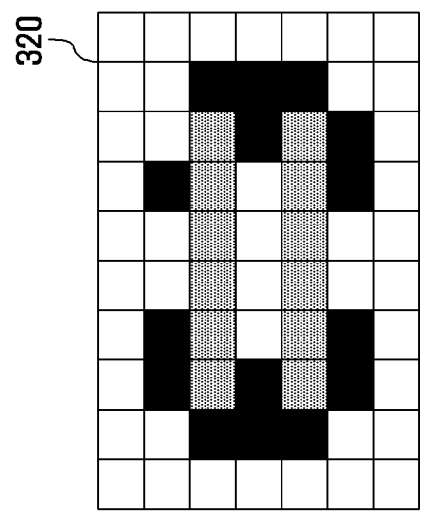
Figure 3:
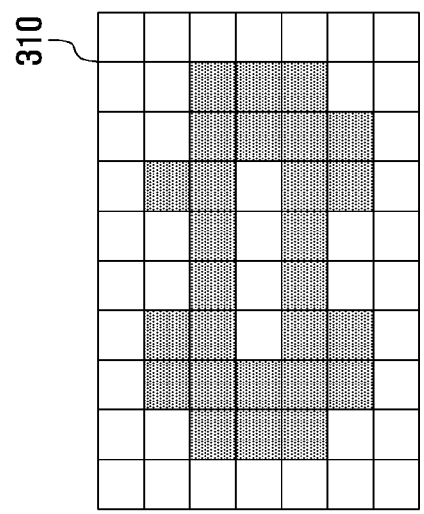

FIG. 3 is a diagram illustrating a method for extracting a feature point for extracting a boundary line based feature point according to an exemplary embodiment of the present invention.

First, the method for extracting a feature point based on a boundary line is described. The boundary line based feature point extracting method is a method for extracting the feature point from an outer-contour and an inner-contour of data such as a character, a number, a figure, and a drawing while not extracting the feature point information from respective stroke information forming the data. For example, a picture may be drawn on the touch screen 110 by hand and the picture is colored through a stroke input. In this case, the feature point may be extracted by using stroke information. However, the feature point may be processed as one image information through a boundary line based feature point extracting method. The boundary line forming data may be divided into the outer-contour and the inner-contour. The pixel information forming the outer-contour and the inner-contour may be used as a feature point. A method for obtaining the outer-contour and the inner-contour information of an object having the same color and obtains the feature point from the information may be used.

At this time, respective boundary line information are considered as one stroke information, and thus, a stroke-based feature point extracting technique may be applied such that the feature point information is extracted. However, when the feature point information is extracted by such a method, a run-based technique of Miyatake (Takafumi Miyatake, Hitoshi Matsushima and Masakazu Ejiri, "Contour representation of binary images using run-type direction codes," Machine Vision and Applications archive, Vol. 9, Iss. 4, Pages: 193-200, 1997) or a pixel/vertex based contour tracing technique may be used to prevent damage of detail pixel information forming the data. The feature point information extracted through the boundary line based feature point extracting method has an advantage in that less saving space in the storage unit 120 is required when saving the information, since an amount of data forming the information is relatively small in comparison with a common image file method.

Referring to FIG. 3, the method displays an example of the boundary line based feature point extracting technique. Reference numeral 310 indicates stroke information forming data input by the user. Reference numeral 320 indicates the feature point information extracted through the feature point extracting technique of the run-based technique. After original data is searched from left to right over each row to precisely extract the feature point information, a left and a right boarder line pixel of corresponding data are extracted as feature point information. Reference numeral 330 displays results of extracting a vertex of data (i.e., a representative point) by using the Miyatake technique. A data structure is formed as a tree structure which is made of vertex when the Miyatake technique is used, and using the tree structure, information such as RD data which identifies a restoring method may be produced. Thus, in a case of a pixel based or vertex based boundary line tracing technique, the outer-contour and the inner-contour pixel information may be altogether obtained, and the feature point may be obtained by using corner pixels. However, the restoring may be facilitated by saving together with data which may discriminate respective techniques. In a case of applying the boundary line based feature point extracting technique, the technique may be used not only for online information such as the stroke information but also for storage of the off line information such as a normal image or a text.

In a case of the run-based technique among the boundary extraction technique, the run-based technique is designed to be applied to data for the use such as a preprocess method for character recognition such as Optical Character Recognition (OCR) or document saving so that data loss may be reduced or lossless data may be saved when data is saved. An image or text may be easily saved by using such characteristic. However, the run-based technique may be applied to a single color object or an object having limited colors rather than an object having many color changes, since such boundary line information usually processes the boundary line having the same color as one object.

As described above, when data is saved through the feature point extracting methods based on the stroke information or the boundary line, the amount of information by data is relatively small. Hence, it is convenient to transmit and receive data with a terminal such as a Personal Computer (PC), a mobile phone, a smart phone, a Home Automation (HA) instrument through a communications unit. When data is displayed, the terminal may restore the feature point information into original data by using the information feature point for each data saved in the storage unit 120. In other words, since feature point information correspond to a part of the stroke information or pixel information forming data, empty information should be restored between adjacent feature point information. When the feature point information includes stroke-based feature points, the feature point information may be restored to be shown more naturally through a spline, and an interpolation technique. In a case of being restored to data by using the stroke-based feature point information, the feature point information may be restored into a state that noise information caused by stroking or minute shaking is eliminated so that visibility and readability of data are more increased. In a case of feature point information extracted by using the boundary line based feature point extracting method, a corresponding restoration algorithm according to respective used techniques is used to restore the inner-contour and the outer-contour, and the color of the feature point information is painted between them to restore the image of data. In a case of only having an outer-contour or inner-contour, the color may be restored according to a type. In a case of the feature point information extracted based on the boundary line, a user's purpose at the time when data is saved is directly reflected since data may be accurately restored. Additionally, the feature point extracting method may also include a method for recognizing data corresponding to character. The method for recognizing character may be mainly divided into an on-line character recognition method and an off-line character cognition method.

The on-line character recognition method extracts the feature point from the stroke information, classifies the feature point into the most similar character element or character candidate group through the technique such as a feature point analysis, dynamic matching, relation analysis of relative location between character elements, input location determination, a neural network technique, a fuzzy inference, a genetic algorithm or a Markov inference model method, and performs the character recognition by converting the stroke information into a character or sign information having an increased probability through the above described technique.

The off-line character recognition is represented by an OCR, and is a technique that recognizes the information of calligraphy or print letter by reading an image formed of pixel. Here, the on-line character recognition is easy to preprocess in comparison with general OCR, and an operation of information such as a script order may be quick and simple. The result of the character recognition may be structured into a character string type so that it has an advantage by requiring only very little storage space. A method for saving data through the feature point extracting method will be illustrated with reference to FIGS. 4 to 7.

Figure 4:
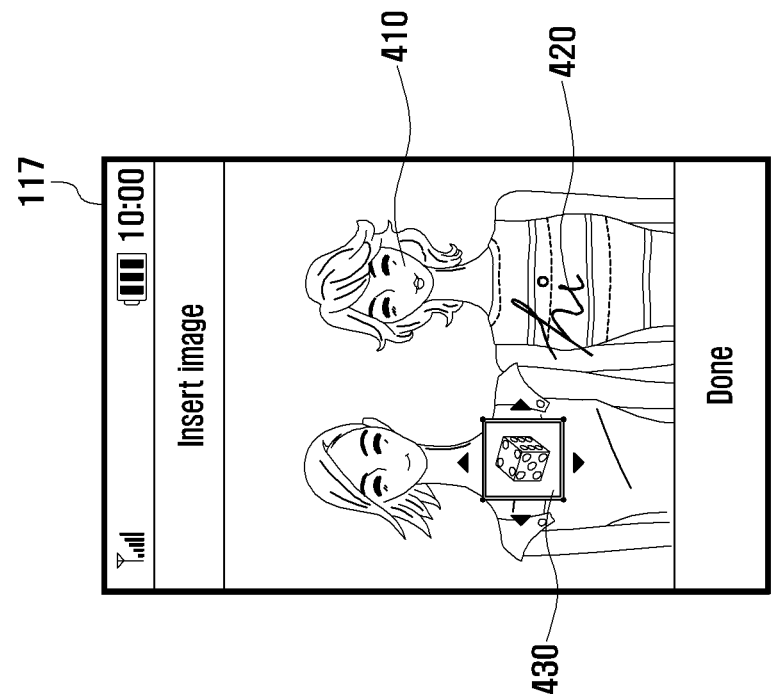
FIG. 4 is a diagram illustrating a screen displaying a plurality of data according to an exemplary embodiment of the present invention.

FIG. 4 is a diagram illustrating a screen displaying a plurality of data on a terminal according to an exemplary embodiment of the present invention.

Referring to FIG. 4, the terminal displays an image 410 on the display unit 117 according to a selection of a user. The terminal displays a plurality of data such as a character Hi 420 and a dice image 430 input through the touch screen 110 on the image 410 displayed on the display unit 117. In the plurality of data displayed on one screen, feature point information is extracted according to data through a feature point extracting method. The extracted feature point information is saved in the storage unit 120 as group feature point information. The data feature point information saved in the storage unit 120 is illustrated with reference to FIG. 5.

Figure 5:
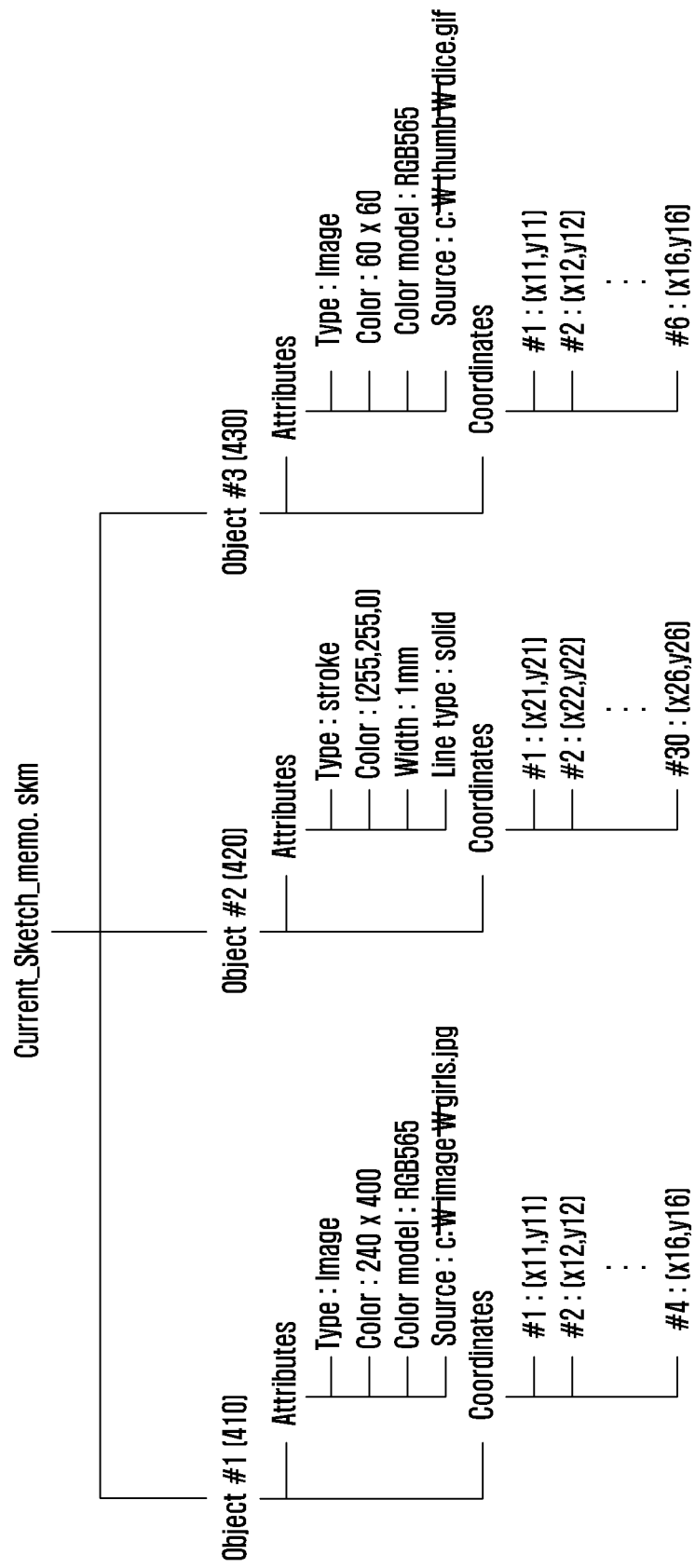
FIG. 5 is a diagram illustrating a format of feature point information saved in a storage unit according to an exemplary embodiment of the present invention.

FIG. 5 is a drawing illustrating a format of feature point information saved in a storage unit in a terminal according to an exemplary embodiment of the present invention.

Referring to FIG. 5, the storage unit 120 groups respective feature point information corresponding to the image 410, the character 420, and the dice image 430 which are three data items illustrated in FIG. 5 under the control of the controller 130, and saves the grouped feature point information in a tree type data structure. That is, at least two data feature point information displayed on one screen are saved as the group feature point information. Here, respective data feature point information saved as the group feature point information may be exemplified as follows.

The feature point information corresponding to the image 410 includes information regarding the type of data, a color forming an image, a saving route, and a location of image, and information regarding the feature point extracting method which was used in extracting the feature point information. The feature point information corresponding to the character 420 includes a data type, a color, a type of line, thickness, a type of data, and a location. Moreover, the dice image 430 includes information regarding the type of data, the image color, the color model, and the location.

In the data display mode, data may be displayed by using the feature point information saved as the group feature point information, and data may be edited according to the selection of the user. That is, a plurality of data which is displayed on one screen is not saved as one image, but feature point information is saved according to each data, so that editing is possible according to data when data is displayed. A method for selecting the feature point extracting method according to data is illustrated with reference to FIGS. 6 to 7.

Figure 6:
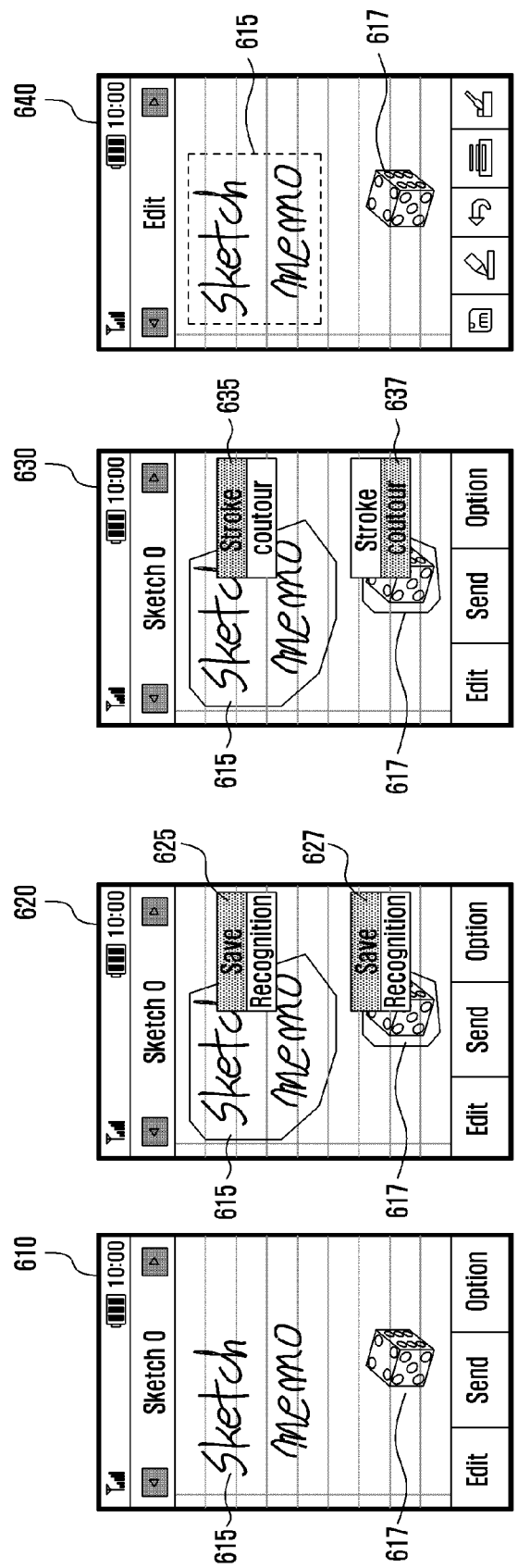
FIG. 6 is a diagram illustrating a screen in a terminal selecting a method for extracting a feature point classified by data according to an exemplary embodiment of the present invention.

FIG. 6 is a diagram illustrating a screen in a terminal for selecting a method for extracting a feature point classified by data according to an exemplary embodiment of the present invention.

Referring to FIG. 6, a screen 610 displays a character 'sketch memo' 615 and a dice image 617 which are data input by a user. According to a selection of the user, as illustrated in screen 620, selection windows 625, 627 in which 'save' or 'recognition' may be selected for respective input data are displayed. When 'save' is selected, as illustrated in screen 630, the selection windows 635, 637 of the feature point extracting method are displayed according to respective input data. At this time, 'stroke' which is a method for extracting a feature point using stroke information and 'contour' which is a boundary line based feature point extracting method are displayed in the selection windows 635, 637 of the feature point extracting method.

As illustrated in screen 630, it is assumed that 'stroke' is selected as a method for extracting feature point for extracting the feature point information of the character 'sketch memo', while 'contour' is selected as a method for extracting feature point for extracting the feature point information of the dice image 617. The feature point information is extracted according to each data by the selected feature point extracting method and saved in the storage unit 120. In a data display mode, data may be displayed by using the feature point information saved in the storage unit 120. That is, as illustrated in screen 640, the character 'sketch memo' 615 and the dice image 617 may be restored into an input original data and displayed.

Figure 7:
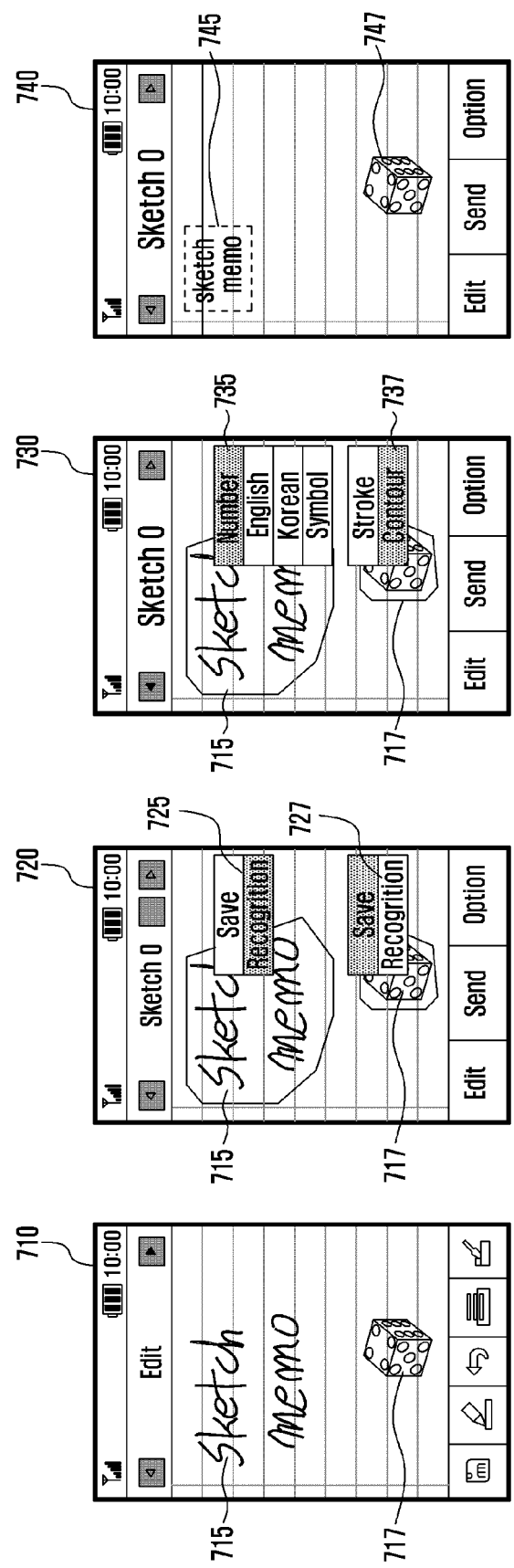
FIG. 7 is a diagram illustrating a screen selecting a method for extracting a feature point classified by data according to an exemplary embodiment of the present invention.

FIG. 7 is a diagram illustrating a screen selecting a method for extracting a feature point classified by data according to an exemplary embodiment of the present invention.

Referring to FIG. 7, the method illustrates an example of applying a character recognition function by an area setting method. A screen 710 displays a character 'sketch memo' 715 and a dice image 717 which are data input by the user. According to the selection of the user, as illustrated in screen 720, selection windows 725, 727 in which 'save' or 'recognition' may be selected for respective input data are displayed. When 'recognition' is selected in the selection window 725 of the character 'sketch memo' 715, and 'save' is selected in the selection window 727 of the dice image 717, selection windows 735, 737 in which the feature point extracting method may be selected are displayed as illustrated in screen 730.

At this time, number, English, Korean, and symbol are displayed in the selection window 735 displayed on the character 'sketch memo' 715, while 'stroke' which is a method for extracting feature point using the stroke information and 'contour', which is a boundary line based feature point extracting method, are displayed in the selection window 737 displayed on the dice image 717. If English is selected in the selection window 737 displayed on the character 'sketch memo' 715, 'contour' which is the boundary line based feature point extracting method is selected in the selection window 737 displayed on the dice image 717, the terminal recognizes the character 'sketch memo' 715 as an on-line character recognition method and extracts the feature point information corresponding to the recognized character.

Moreover, the terminal extracts the feature point information of the dice image 717. The terminal saves the feature point information extracted according to respective data in the storage unit 120. When data is displayed by using the feature point information saved, as illustrated in reference numeral 740, the terminal may display the character 'sketch memo' 745 with a character for terminal. Moreover, the terminal may display the dice image 747 with an original image. The method for recognizing a character through the feature point extracting method is a method which may be used in a small terminal like a portable terminal, because a character is written in a small area that is difficult to input a character. Additionally, since resolution of an input unit is not high due to the nature of a portable terminal, a letter is frequently input roughly and large. Accordingly, the input of the character may be replaced with the data recognized through the feature point extracting method of an exemplary embodiment of the present invention.

When the user inputs data, the terminal sets an area/location to which data are input to be large to more precisely input online information, recognizes a result of writing down on a corresponding area as a size adjusted to an actual area/location on which data are to be displayed. If necessary, the size of the input result may be preset as an item such as an option, so that data may be automatically converted to be adjusted to a preset size even when data are input largely.

Figure 8:
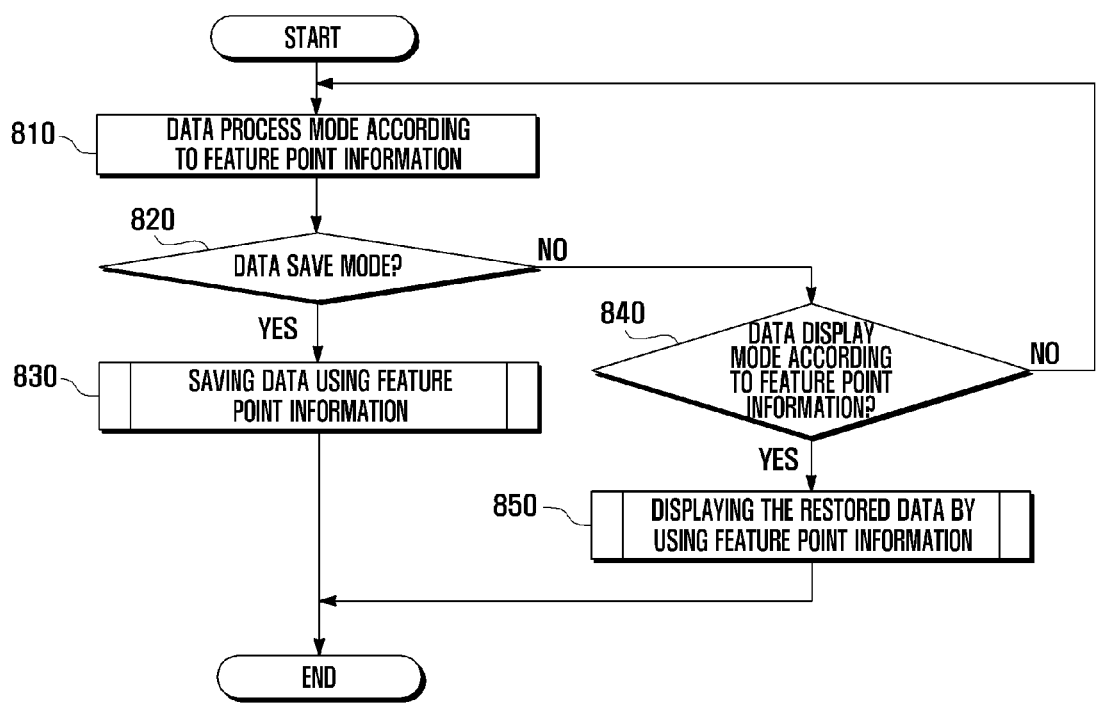
FIG. 8 is a flowchart illustrating a method for processing data in a terminal according to an exemplary embodiment of the present invention.

FIG. 8 is a flowchart illustrating a method for processing data in a terminal according to an exemplary embodiment of the present invention.

Referring to FIG. 8, the terminal performs a data process mode according to feature point information based on a selection of a user in step 810. Here, the data process mode may be a Data save mode and a data display mode. The terminal determines whether the data process mode is a Data save mode in step 820. If it is determined that the data process mode is a Data save mode, the terminal saves data using feature point information in step 830, which is described in more detail below with reference to FIG. 9. On the other hand, if it is determined that the executing data process mode is not a Data save mode in step 820, the terminal determines whether executing data process mode is a data display mode according to feature point information in step 840. If it is determined that the executing data process mode is a data display mode, the terminal displays the restored data to the display unit 117 by using feature point information in step 850, which is described in more detail further below with reference to FIG. 10. The method for extracting the feature point information and saving data in step 830 is described in more detail below with reference to FIG. 9.

Figure 9:
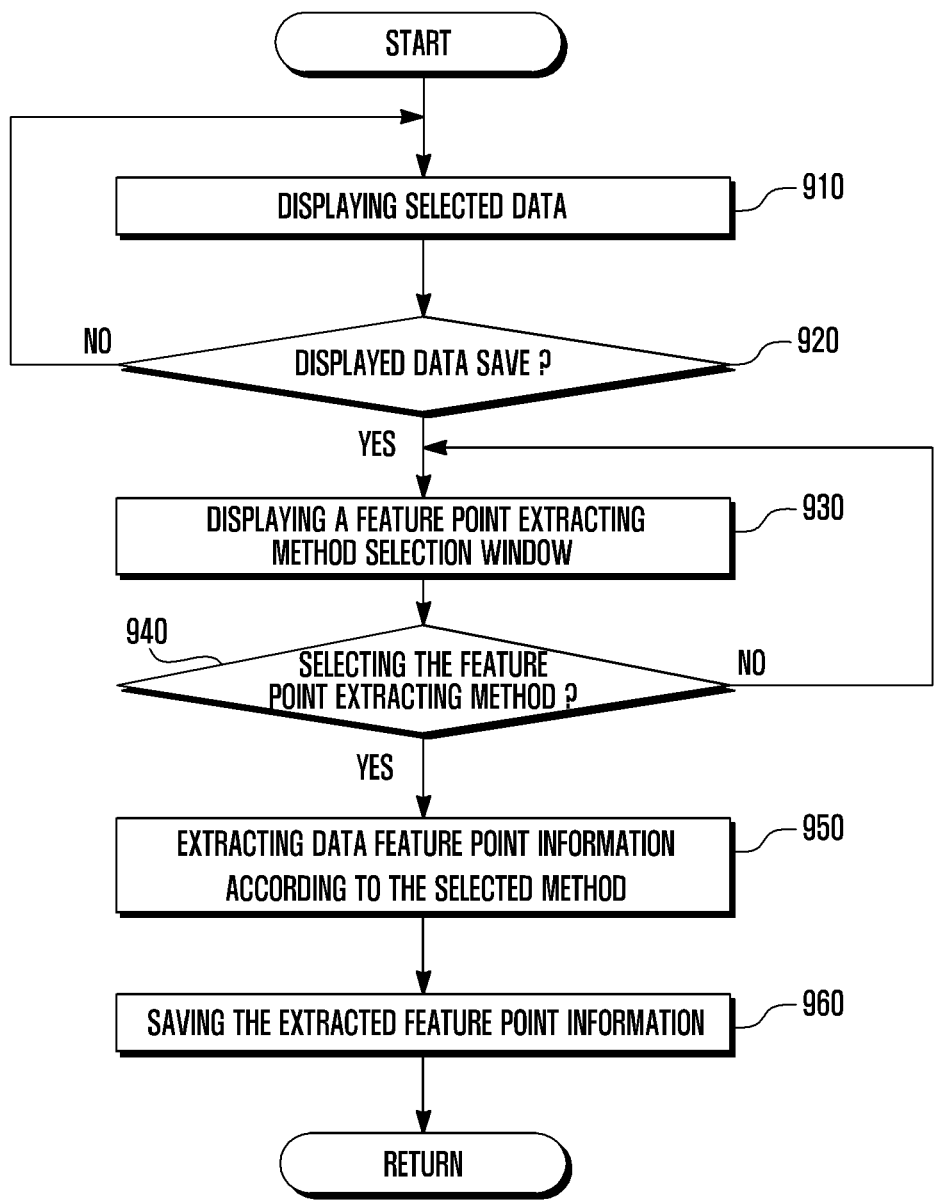
FIG. 9 is a flowchart illustrating a method for saving data in a terminal according to an exemplary embodiment of the present invention.

FIG. 9 is a flowchart illustrating a method for saving data in a terminal according to an exemplary embodiment of the present invention.

Referring to FIG. 9, if it is determined that the data process mode is a Data save mode in step 830, the terminal displays at least one data which is selected by the user to the display unit 117 in step 910. Here, the data which is selected by the user may be data such as a character or an image input through a specific input mode or data such as a character or an image selected through a specific data display mode. The terminal determines whether the displayed data saved on the display unit 117 is selected in step 920. If it is determined that the displayed data saved is selected, the terminal displays a feature point extracting method selection window according to the data displayed on the display unit 117 in step 930. The terminal determines whether the feature point extracting method is selected in the displayed feature point extracting method selection window in step 940.

If it is determined that the feature point extracting method is selected in step 940, the terminal extracts data feature point information according to the selected feature point extracting method in step 950. The terminal saves the extracted feature point information in the storage unit 120 in step 960.

At this time, the terminal sets feature point information for a plurality of data displayed on one screen as group feature point information and saves group feature point information in the storage unit 120. The terminal restores a plurality of data displayed on one screen intact and displays the plurality of data by using the group feature point information. According to the selection of the user, respective data displayed on one screen may be edited and displayed by the terminal. The method for extracting the feature point information and saving data has been described above. The method for restoring feature point information and displaying by data will be described below with reference to FIG. 10.

Figure 10:
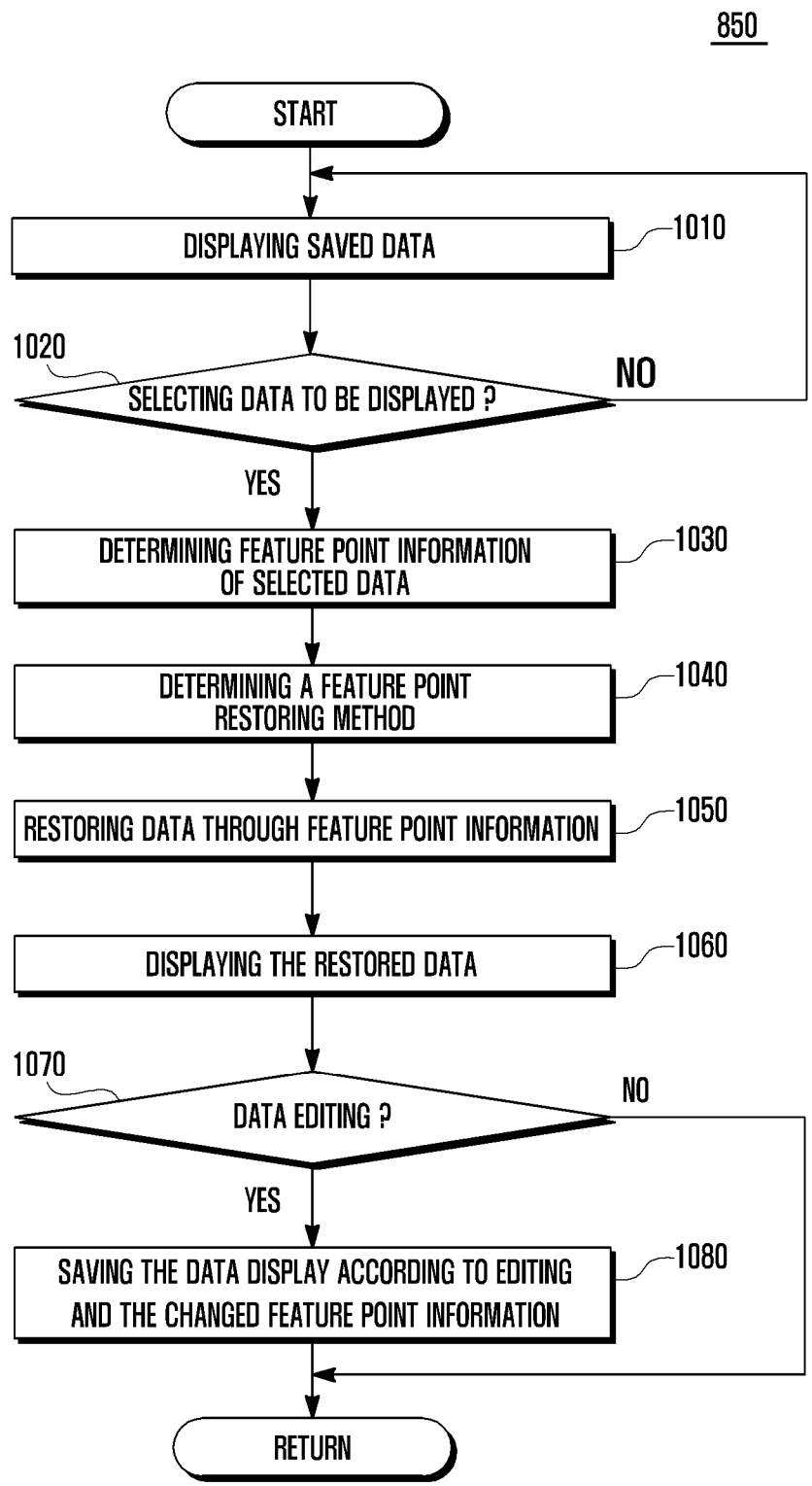
FIG. 10 is a flowchart illustrating a method for displaying data in a terminal according to an exemplary embodiment of the present invention.

FIG. 10 is a flowchart illustrating a method for displaying data in a terminal according to an exemplary embodiment of the present invention.

Referring to FIG. 10, if it is determined that the data process mode performed is a data display mode in step 840, the terminal displays all data saved in the storage unit 120 to the display unit 117 in step 1010. Here, the displayed data is not original data but data generated to be displayed on the display unit 117 in the form of a thumbnail. The terminal determines whether data to be displayed by the user is selected in step 1020. If it is determined that the data to be displayed is selected, the terminal determines group feature point information corresponding to the selected data among the feature point information saved in the storage unit 120 in step 1030. The terminal determines a feature point restoring method for restoring the determined feature point information in step 1040.

The terminal restores the feature point information into data by using the feature point restoring method in step 1050. The terminal displays the restored data to the display unit 117 in step 1060. At this time, the terminal restores and displays a plurality of data which is displayed on one screen before extracting and saving the feature point. The terminal displaying the restored data to the display unit 117 determines whether data editing is selected in step 1070. When data editing is selected, the terminal saves the data display according to editing and the changed feature point information in the storage unit 120 in step 1080.

For example, it is assumed herein that image is restored through the feature point information. When the user changes the size of restored image through the edit function, the terminal extracts the feature point information of the changed image again. The terminal updates by the extracted feature point information in the storage unit 120. According to an exemplary embodiment of the present invention, when the stroke information is input by using a pointing device such as a touch screen or a touch pad, saving and managing is possible through the feature point information which is not an image file type, so that saving space in the storage unit 120 may be economized.

Accordingly, the terminal can save more data and transmission speed is increased when transmitting and receiving data with another terminal. The feature point can be extracted by a suitable method according to data by setting a plurality of data saving methods on one screen. The terminal memorizes the order of data input and an attribute, so that data can be edited by using the attribute such as color, size, location, line type, and thickness of line.

While the invention has been shown and described with reference to certain exemplary embodiments thereof, it will be understood by those skilled in the art that various changes in form and may therein without departing from the spirit and scope of the present invention as defined in the appended claims and their equivalents.

What is claimed is:

1. A method for processing data of a terminal, the method comprising:
    displaying a feature point extracting method selection window when the terminal is in a Data save mode which saves at least one data displayed on a touch screen of the terminal, the feature point extracting method selection window displaying a feature point extracting method for extracting feature point information from a plurality of data displayed on the touch screen;
    extracting the feature point information from the displayed data by using the feature point extracting method selected through the feature point extracting method selection window;
    saving at least one feature point information extracted from the displayed data as group feature point information;
    determining a feature point restoring method for restoring the group feature point information for displaying data and the feature point information into the displayed data, in a data display mode which displays data corresponding to the saved feature point information; and
    restoring data group information included in the group feature point information into the displayed data through the determined feature point restoring method,
    wherein the feature points are extracted by analyzing only the plurality of data displayed on the touch screen originally, and
    wherein the displayed data are input through the touch screen.

2. The method of claim 1, wherein the restoring of the data group information comprises:
    editing the displayed data according to a selection, when data editing for editing the displayed data is selected; and
    extracting changed feature point information from the edited data and updating the feature point information by the extracted feature point information.

3. The method of claim 1, wherein the feature point extracting method is at least one of a method for extracting a feature point based on stroke information corresponding to spots forming the displayed data, a method for extracting a feature point based on a boundary line forming the displayed data, and an on-line character recognition method for recognizing a character.

4. An apparatus for processing data in a terminal, the apparatus comprising:
    a hardware display configured to display at least one selected data, and to display a feature point extracting method selection window including a feature point extracting method for extracting feature point information from a plurality of data displayed on a touch screen;
    a controller configured to extract at least one feature point information from the displayed data by using the feature point extracting method selected through the feature point extracting method selection window, in a Data save mode saving the displayed data; and
    a storage unit configured to store at least one feature point information extracted from the displayed data as group feature point information under control of the controller,
    wherein the controller determines a feature point restoring method for restoring the group feature point information for displaying data and the feature point information into the data, and restores data group information included in the group feature point information through the determined feature point restoring method into the data, in a data display mode displaying data corresponding to the saved feature point information,
    wherein the feature points are extracted by analyzing only the plurality of data displayed on the touch screen originally, and
    wherein the displayed data are input through the touch screen.

5. The apparatus of claim 4, wherein the controller, when data editing for editing the restored data is selected, edits a corresponding data according to a selection, extracts changed feature point information from the edited data, and updates the feature point information saved in the storage unit by the extracted feature point information.

6. The apparatus of claim 4, wherein the feature point extracting method comprises at least one of a method for extracting a feature point based on stroke information corresponding to spots forming the data, a method for extracting a feature point based on a boundary line forming the data, and an on-line character recognition method for recognizing a character.

* * * * *